United States Patent
Tabata et al.

[19]

[11] Patent Number: 6,115,187
[45] Date of Patent: *Sep. 5, 2000

[54] OPTICAL DEVICE AND IMAGE READING APPARATUS

[75] Inventors: Masami Tabata, Isehara; Tatsundo Kawai, Hadano, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/178,498

[22] Filed: Oct. 26, 1998

[30] Foreign Application Priority Data

Oct. 29, 1997 [JP] Japan ................................. 9-297106

[51] Int. Cl.$^7$ ....................................................... G02B 3/00
[52] U.S. Cl. .......................... 359/654; 359/618; 359/722; 359/724; 358/509; 358/512
[58] Field of Search ..................................... 359/723, 722, 359/724, 618, 619, 634, 636, 652–654; 250/578.1; 358/509, 512

[56] References Cited

U.S. PATENT DOCUMENTS

| | | | |
|---|---|---|---|
| 4,435,039 | 3/1984 | Lama et al. | 350/96.25 |
| 4,512,641 | 4/1985 | Mochizuki et al. | 350/573 |
| 4,571,022 | 2/1986 | Lama et al. | 350/96.25 |
| 4,626,082 | 12/1986 | Mochizuki et al. | 350/573 |
| 4,680,644 | 7/1987 | Shirato et al. | 358/294 |
| 4,791,493 | 12/1988 | Ogura et al. | 358/294 |
| 4,920,431 | 4/1990 | Ogura et al. | 358/496 |
| 4,926,058 | 5/1990 | Iwamoto et al. | 250/578.1 |
| 4,952,026 | 8/1990 | Bellman et al. | 350/167 |
| 4,971,423 | 11/1990 | Nakata et al. | 350/96.1 |
| 4,996,606 | 2/1991 | Kawai et al. | 358/475 |
| 5,004,905 | 4/1991 | Yoshinoui et al. | 250/208.1 |
| 5,101,285 | 3/1992 | Kawai et al. | 358/471 |
| 5,187,595 | 2/1993 | Kitani et al. | 358/482 |
| 5,233,442 | 8/1993 | Kawai et al. | 358/482 |
| 5,258,873 | 11/1993 | Mishina et al. | 359/654 |
| 5,272,548 | 12/1993 | Kawai et al. | 358/482 |
| 5,717,502 | 2/1998 | Kawai | 358/471 |

FOREIGN PATENT DOCUMENTS

| | | |
|---|---|---|
| 0038693 | 10/1981 | European Pat. Off. . |
| 0299704 | 1/1989 | European Pat. Off. . |
| 2093604 | 9/1982 | United Kingdom . |

*Primary Examiner*—Georgia Epps
*Assistant Examiner*—David N. Spector
*Attorney, Agent, or Firm*—Fitzpatrick, Cella, Harper & Scinto

[57] ABSTRACT

In an image sensor having a photoelectric conversion element for receiving light, an illumination unit, and a lens array in which a plurality of gradient index lens elements for focusing light reflected by an original onto the photoelectric conversion element are arrayed, part of the peripheral portion of the lens of the gradient index lens element in the radius direction contains a light absorber for absorbing light having a predetermined wavelength other than the wavelength distribution of light emitted by the illumination unit. With this arrangement, since the optical influences of the peripheral portion of the lens element, which degrade the lens resolution can be eliminated, and the lens elements can be accurately arrayed, there can be provided an image sensor which is free from crosstalk between the lens elements although the lens elements are arrayed in tight contact with each other, and has a large focal depth by changing the angular aperture, high performance, and hardly any performance variations in mass production, and an information processing system using the image sensor.

68 Claims, 9 Drawing Sheets

OPTICAL DEVICE AND IMAGE READING APPARATUS

BACKGROUND OF THE INVENTION

1. Field of the Invention

The present invention relates to an optical device and an image reading apparatus.

2. Related Background Art

A conventional reading apparatus in a facsimile system, scanner system, or any other information processing system often uses an integral image sensor constructed by an illumination unit for illuminating an original, a lens for focusing light reflected by the original and having information of the original, and a sensor for converting the reflected light focused by the lens into an electrical signal.

Such lenses are mainly classified into a reduction-type lens for reducing and forming an image of light reflected by an original, and a full-scale lens for forming a full-scale image of light reflected by an original.

The most popular example of the latter full-scale lens is a so-called lens array in which a large number of lens elements are arrayed to cover a length corresponding to the width of an original.

Strong demand has recently arisen for a compact information processing system such as a facsimile system or scanner system. The reduction-type lens is not desired because it requires a large optical path length, and a lens array, i.e., a full-scale lens having a small optical path length is gaining popularity.

In a lens array, a plurality of cylindrical lens elements having a lens function by setting different refractive indices in the peripheral and central portions are arrayed in line on a flat side plate.

As the methods of manufacturing a gradient index lens element, methods using ion exchange and interdiffusion are available. In the ion exchange method, a glass rod containing exchangeable ions is dipped or brought into contact with a molten salt containing ions contributing to the refractive index distribution to exchange the ions in the glass rod and the molten salt, thereby forming a refractive index distribution in the glass rod. In the interdiffusion method, several types of transparent liquid materials (generally plastics) having different refractive indices are spun by a concentric composite spinning nozzle from the central portion in descending order of refractive index. At the same time, the respective layers are interdiffused to form a refractive index distribution. The resultant lens element is cured with ultraviolet irradiation or the like.

A method of arraying lens elements will be described below. To prevent flare light reflected at the side surface of a gradient index lens element, the outer surface of the lens element is coated with a light absorber having a refractive index nearly equal to that of the lens. The lens elements are then arrayed on a side plate with high precision, and an upper side plate is then placed on the lens elements. The resultant structure is fixed with an adhesive to obtain a lens array.

In arraying the gradient index lens elements, when they are brought into tight contact with each other, a better array can be obtained and lens characteristics such as resolution stabilize without any variation.

The light absorber applied to the outer surface of each lens element have a very small thickness in order to improve the outer dimensional precision of the lens element. When the lens elements are arrayed in tight contact with each other, crosstalk light passes through each element to enter an adjacent lens element to degrade the lens performance.

To prevent this problem, an arbitrary gap is set between two adjacent lens elements, and a light absorption adhesive is filled in the gap to cut the crosstalk light.

The image formation area in which each lens element transmits light reflected by an original onto a sensor IC falls within an image formation radius XO determined by an angular aperture $\theta$ unique to the lens element. The image formation radii XO of the respective lens elements overlap each other to form a linear image formation area having a width 2 XO in the entire lens array.

The conventional example suffers the following problems.

(1) It is difficult to form an ideal refractive index distribution from the center to the peripheral portion of the gradient index lens element due to manufacturing techniques. The refractive index of the peripheral portion is particularly offset from the ideal value. This becomes one of the causes which decreases the resolution of the lens.

(2) In arraying the lens elements, an arbitrary gap is formed between the two adjacent lens elements. Manufacturing variations which influence the lens characteristics, such as an irregular array pitch of lens arrays and tilt of the lens elements, occur.

(3) In the lens array, as images formed by a large number of lens elements overlap each other to form a final image, the focal depth of the lens array is smaller than that of a single lens element.

(4) The focal depth of the lens array is determined by the angular aperture unique to the lens array. Conventionally, an arbitrary angular aperture cannot be set.

SUMMARY OF THE INVENTION

It is an object of the present invention to provide an optical device and an image reading apparatus, which have a large focal depth of a lens and high performance, and suffer little performance variations introduced at the time of quantity production.

In order to achieve the above object, according to an embodiment of the present invention, there is provided an optical device comprising an illumination unit for illuminating an object to be photographed, and a lens array having a plurality of lenses for forming an image of light from the object, illuminated with the illumination unit, at an image formation position, wherein the lens contains a light absorber for absorbing light having a predetermined wavelength other than a wavelength of light emitted by the illumination unit.

According to another embodiment, there is provided an optical device comprising an illumination unit for illuminating an object to be photographed, and a lens array having a plurality of lenses for forming an image of light from the object, illuminated with the illumination unit, at an image formation position, wherein the lens contains a light absorber for absorbing light emitted by the illumination unit.

According to still another embodiment, there is provided an image reading apparatus comprising an illumination unit for illuminating an object to be photographed, a lens array having a plurality of lenses for forming an image of light from the object, illuminated with the illumination unit, at an image formation position, a photoelectric conversion element for receiving the light focused by the lens, and control means for controlling the illumination unit and the photoelectric conversion element, wherein the lens contains a light absorber for absorbing light having a predetermined wavelength other than a wavelength of light emitted by the illumination unit.

According to still another embodiment, there is provided an image reading apparatus comprising an illumination unit for illuminating an object to be photographed, a lens array having a plurality of lenses for forming an image of light from the object, illuminated with the illumination unit, at an image formation position, a photoelectric conversion element for receiving the light focused by the lens, and control means for controlling the illumination unit and the photoelectric conversion element, wherein the lens contains a light absorber for absorbing light emitted by the illumination unit.

With the above arrangements, there can be provided optical devices and image reading apparatuses, which have a large focal depth of a lens and high performance, and suffer little performance variations at the time of manufacture.

The above and other objects, features, and advantages of the present invention will be apparent from the following detailed description in conjunction with the accompanying drawings.

DESCRIPTION OF THE PREFERRED EMBODIMENTS

An image sensor according to the first embodiment will be described with reference to the accompanying drawings.

Figure 1:
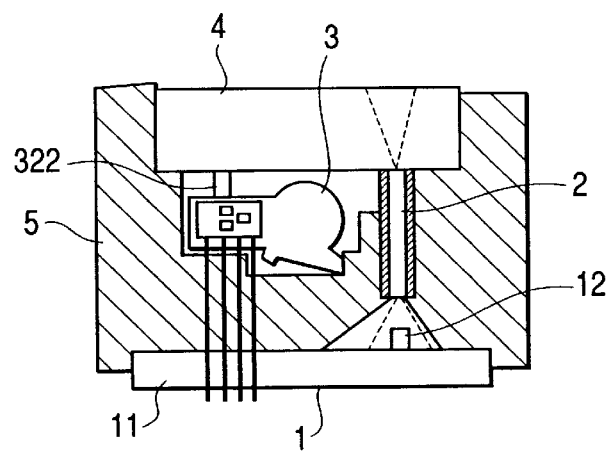
FIG. 1 is a sectional view of an image sensor according to an embodiment.
Figure 2:
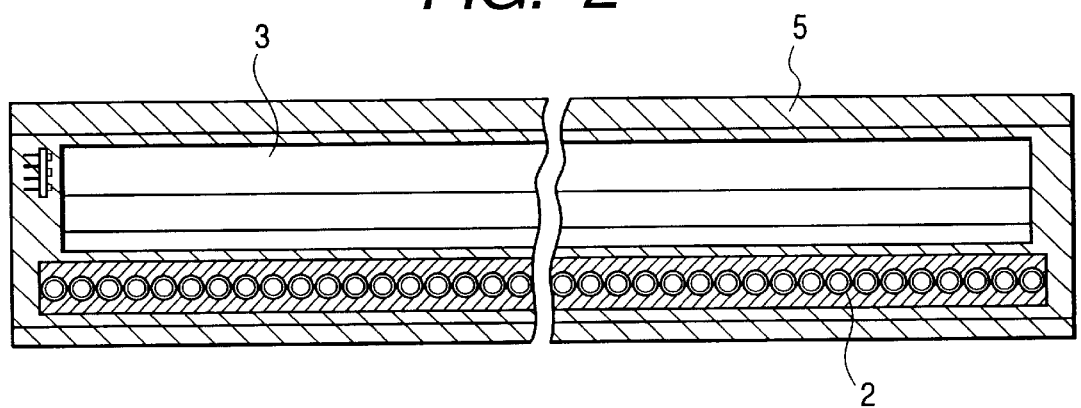
FIG. 2 is a plan view of the image sensor of the embodiment.

As shown in the sectional view of FIG. 1 and the plan view of FIG. 2, the image sensor of this embodiment comprises a sensor array 1, a lens array 2, an illumination unit 3, a glass cover 4, and a frame 5. In the sensor array 1, a sensor IC 12 having a linear group of photoelectric conversion elements is arrayed with high precision on a sensor board 11 made of a glass-epoxy material by the number of photoelectric conversion elements corresponding to the length of a read original. The glass cover 4 is made of a transparent member for supporting the original. The frame 5 made of a metal (e.g., aluminum) or resin (e.g., polycarbonate) holds the sensor array 1, the lens array 2, the illumination unit 3, and the glass cover 4 in position.

The operation of the above image sensor will be described below. The illumination unit 3 obliquely illuminates the original pressed and supported on the glass cover 4 by sequentially switching R, G, and B light beams. Light having color information of R, G, and B and reflected by the original is focused on the sensor IC 12. The sensor IC 12 converts the light having the color information of R, G, and B into an electrical signal and transmits it to a system section (not shown). The system section processes the electrical signal of three colors, R, G, and B and reproduces a color image.

Figure 3:
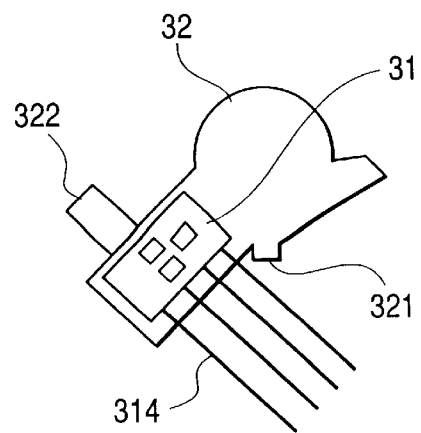
FIG. 3 is a side view of an illumination unit of the embodiment.
Figure 4:
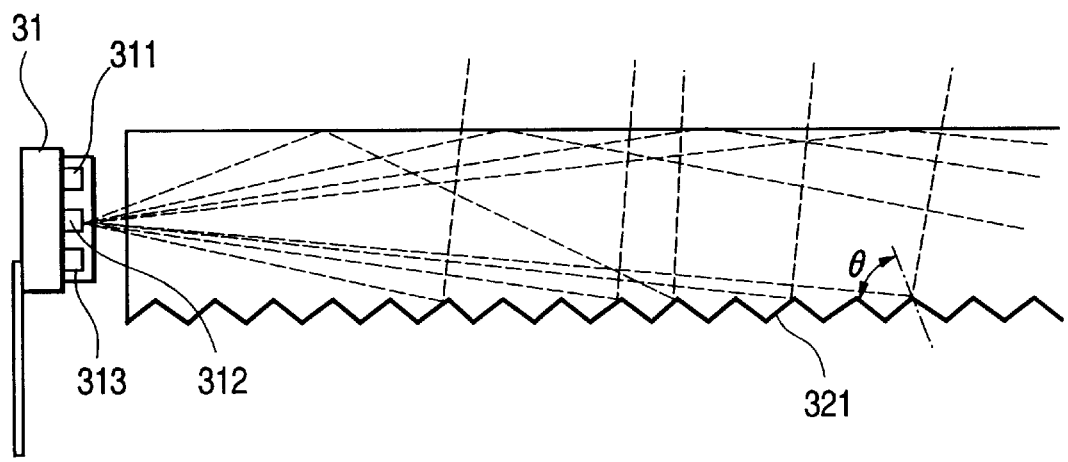
FIG. 4 is a detailed view of the illumination unit of the embodiment.

FIG. 3 is a side view of the illumination unit, and FIG. 4 is its detailed view. The illumination unit 3 comprises a RGB tricolor LED light source 31 in which a red (R) LED element 311, a green (G) LED element 312, and a blue (B) LED element 313 as light sources are integrally packaged, and a light guide member 32 made of a transparent member such as an acrylic resin.

Figure 5:
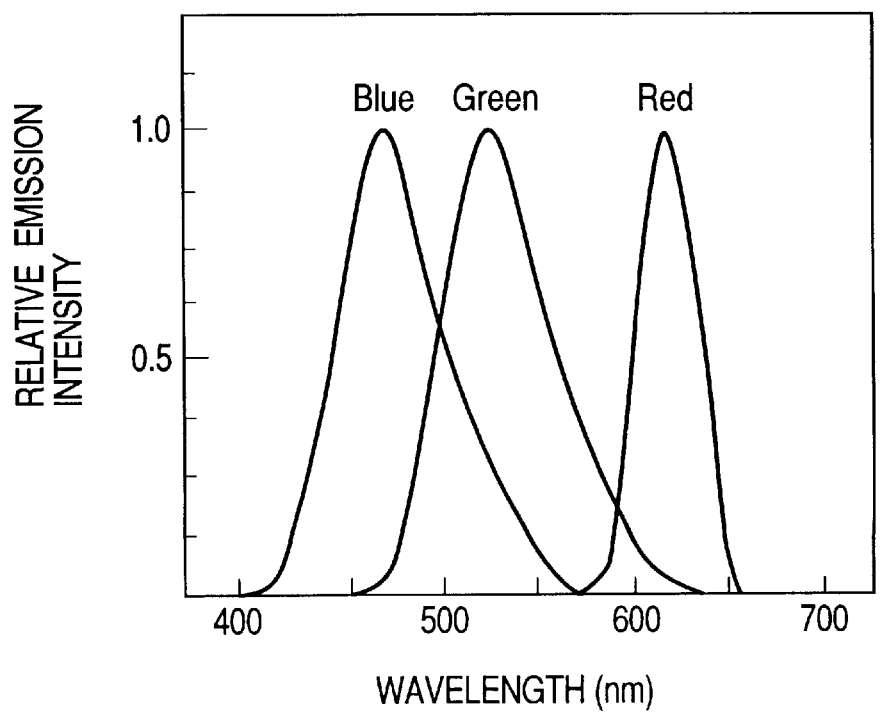
FIG. 5 is a graph showing the emission spectrum of a light source in the illumination unit of the embodiment.

FIG. 5 shows emission wavelength spectra of the R, G, and B LED elements 311, 312, and 313. These peak emission wavelengths are selected in the ranges of 600 to 660 (nm), 510 to 560 (nm), and 450 to 480 (nm), respectively.

The RGB tricolor LED light source 31 is arranged so that light is incident from one or both of the longitudinal end portions of the light guide member 32. The incident light repeats total reflection at the interface between the light guide member 32 and air and propagates in the light guide member 32.

As shown in the detailed view of the illumination unit in FIG. 4, an internal saw-toothed portion 321 having a fine saw-toothed shape is continuously formed in the light guide member 32 along its longitudinal direction. Of all the light components propagating in the light guide member 32, light components incident on the saw-toothed portion 321 are reflected at large angles toward the surface of the original, unlike the remaining light components. The light components incident on the saw-toothed portion 321 do not satisfy the total reflection condition at the interface between the light guide member 32 and air and emerge in a desired direction.

The reflecting surface of the saw-toothed portion 321 is deposited with aluminum or printed with silver or white ink. Alternatively, the saw-toothed portion 321 may totally reflect light at the interface with air by only the saw-toothed shape.

Alternatively, the saw-toothed shape may not need to be formed. The same effect as described above may be obtained by printing the reflecting surface with white ink or by roughening it. To obtain a uniform illuminance on the surface of the original, it is possible to increase the width of the saw teeth with an increase in distance from the light source or increase the printing area if only white ink is used.

That portion of the light guide member 32 which excludes the light-exit portion and outputs light toward the original is covered with a white member or the like to increase the illuminance of the original surface.

Figure 6:
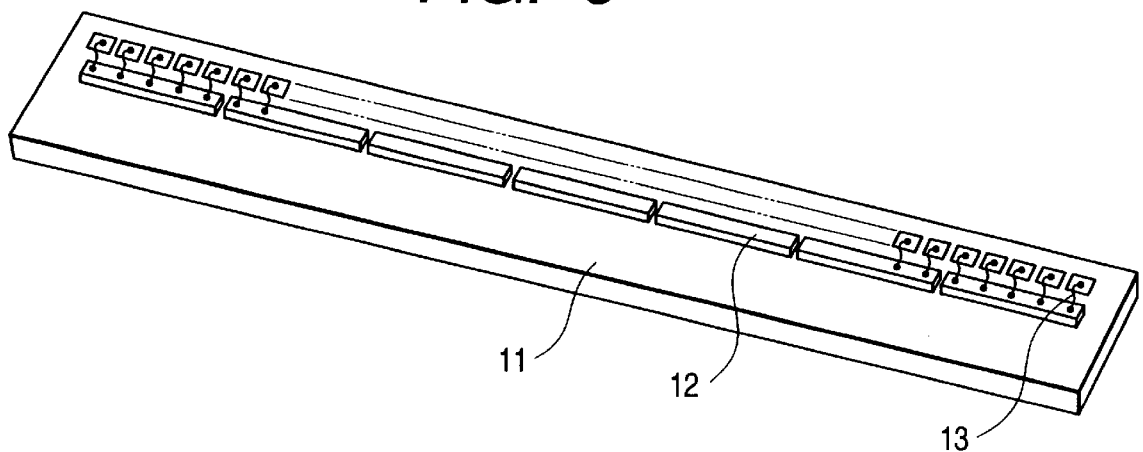
FIG. 6 is a detailed view of a sensor array of the embodiment.

FIG. 6 is a detailed view of the sensor array 1, and its arrangement will be described below.

The sensor board 11 has electrical wiring and comprises a ceramic board or a glass-epoxy substrate obtained by impregnating glass fibers with an epoxy resin.

The sensor IC 12 comprises CCD or CMOS photoelectric conversion elements for converting light into an electrical signal, and the plurality of sensor ICs 12 are arrayed in line on the sensor board 11 and adhered through an adhesive.

Figure 7:
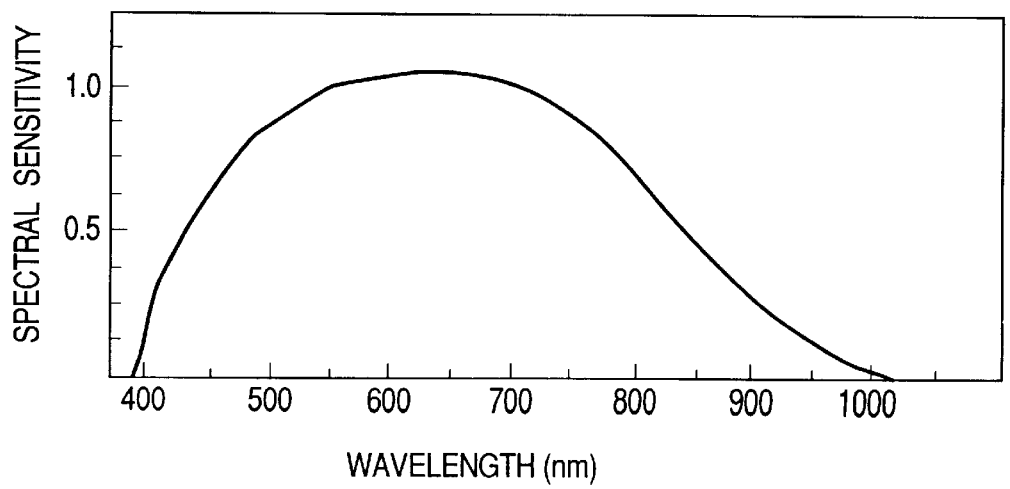
FIG. 7 is a graph showing the spectral sensitivity of a sensor IC of the embodiment.

The electrical contact between the sensor ICs 12 and the sensor board 11 is obtained through gold wires 13. The spectral sensitivity characteristics of the sensor IC 12 are shown in FIG. 7. The IC 12 has a high sensitivity for a wavelength range wider than the emission wavelength range of the light source and, particularly, for an infrared ray having a long wavelength.

Figure 8:
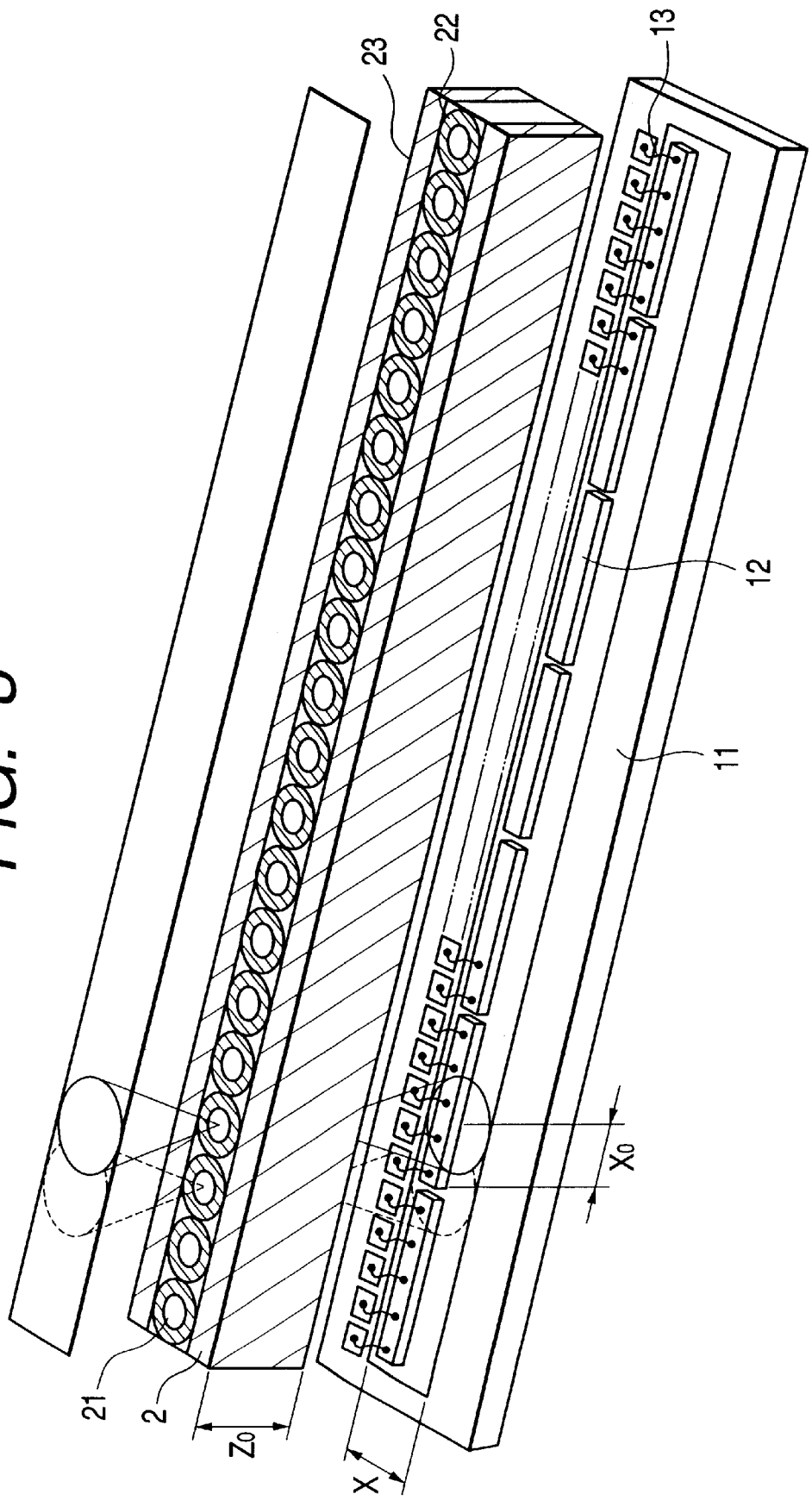
FIG. 8 is a detailed view of a lens array of the embodiment.

FIG. 8 is a detailed view of the lens array 2 used in this embodiment.

The lens array 2 of this embodiment comprises gradient index lens elements 21 and light absorption layers 22 containing a light absorber and surrounding the lens elements 21.

As its manufacturing method, the ion exchange method and interdiffusion method will be described below.

In the ion exchange method, core glass having exchangeable ions and light absorption glass having exchangeable ions and containing a light absorber are heated and melted in the inner and outer nozzle portions in a concentric double spinning nozzle and are spun together to form a double glass rod having a core portion and its outer light absorption layer 22. The double glass rod is cut in an appropriate size, and the cut rod is dipped in a molten salt containing exchangeable ions. The exchangeable ions in this double glass rod are exchanged with the exchangeable ions in the molten salt.

Figure 9:
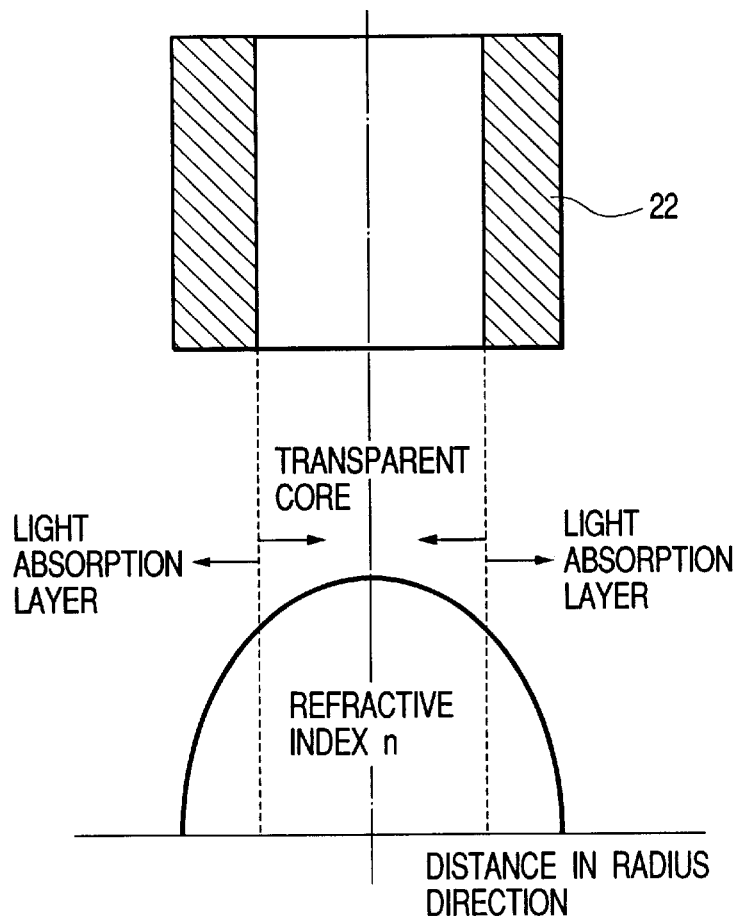
FIG. 9 is a view showing the refractive index distribution and light absorption layer of a lens element of the embodiment.

The ion-exchanged double glass rod serves as a rod lens having a transparent core portion and a surrounding light absorption layer 22 which respectively have the refractive index distributions shown in FIG. 9.

In the interdiffusion method, when several types of liquid plastics having different refractive indices are to be spun by a concentric composite spinning nozzle from the central portion in descending order of refractive index, at least one outer nozzle of the core nozzle of the concentric composite spinning nozzle spouts a layer of liquid plastic containing a light absorber. Interdiffusion is performed to form a refractive index distribution, and the resultant structure is cured with ultraviolet irradiation. Therefore, a rod lens having a transparent core portion and a surrounding light absorption layer 22 which respectively have refractive index distributions is formed.

The liquid plastic is normally an acrylic resin having a high light transmittance. However, any other light-transmitting resin may be used. An alternative material is glass if it can be liquefied.

As the materials to be interdiffused, the liquid plastics of the respective layers may be interdiffused. Alternatively, some components (ion, for example) of the liquid plastics may be interdiffused.

Figure 10:
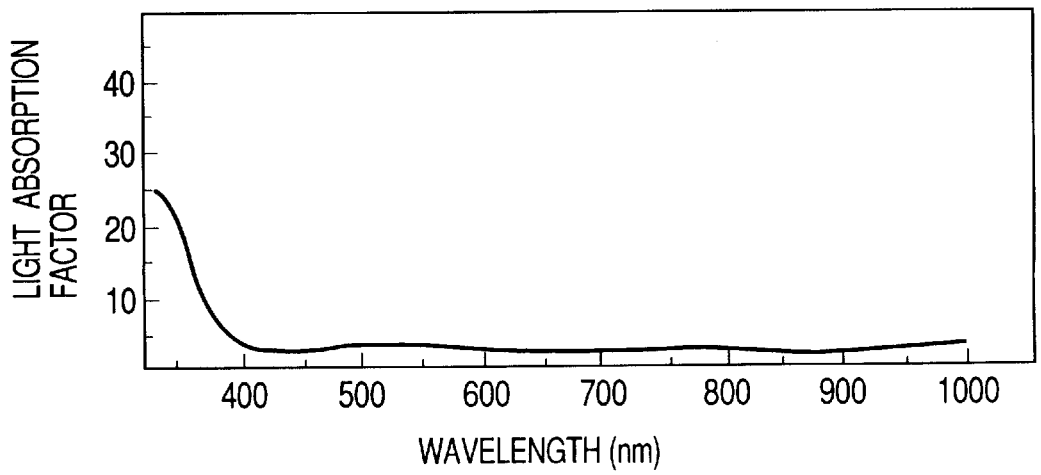
FIG. 10 is a graph showing the light absorption characteristics of the light absorption layer of the lens element of the embodiment.

The light absorption characteristics of the light absorption layer 22 of this embodiment are shown in FIG. 10. Almost constant absorption characteristics are set for all the emission wavelengths of the light sources and the spectral sensitivity range of the sensor.

In manufacturing a rod lens by the interdiffusion method, the liquid plastic is finally cured with an ultraviolet ray. For this reason, the characteristic of the light absorption layer 22 is set to transmit light components within a certain ultraviolet wavelength range or more, which are required in ultraviolet curing.

To form a light absorption layer 22 having desired light absorption characteristics, it is effective to use a plastic containing a plurality of dyes, pigments, or their combination as a light absorber.

Figure 11:
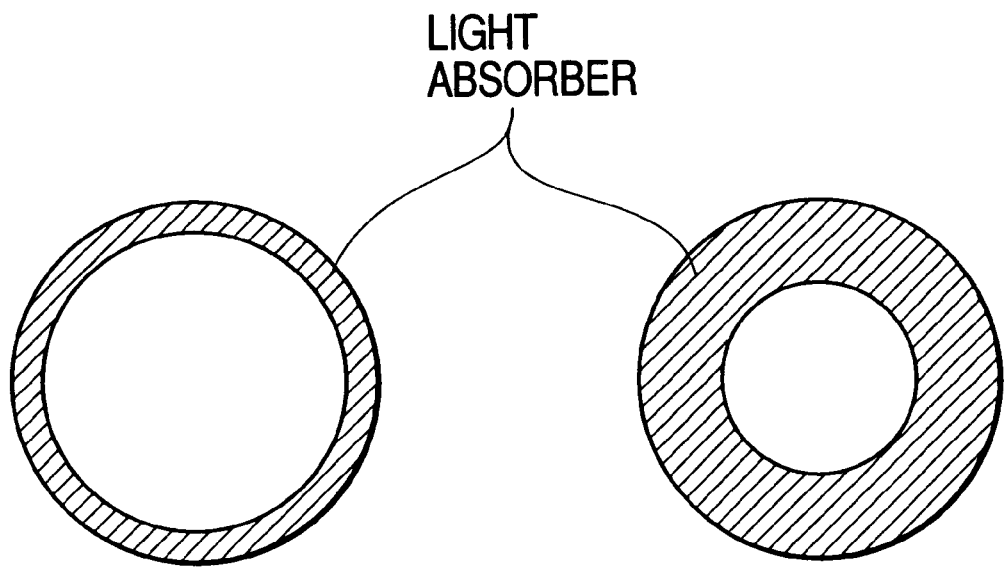
FIG. 11 is a cross-sectional view showing part of a gradient index lens portion containing a light absorber of the embodiment.
Figure 12:
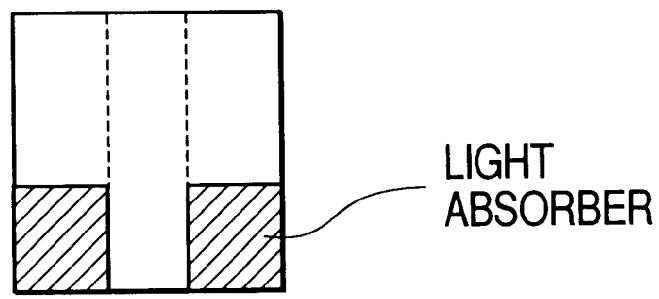
FIG. 12 is a longitudinal sectional view showing part of the gradient index lens portion containing the light absorber of the embodiment.

The light absorber-containing portion of the gradient index lens may be small or large in thickness in the radius direction, as shown in FIG. 11. The light absorber-containing portion of the gradient index lens may be part of the peripheral portion, as shown in FIG. 12.

Lens elements 21 are arranged and coated with an adhesive such as an epoxy resin adhesive applied thin on a side surface 23 made of a glass-epoxy material.

The large number of lens elements 21 made of the double glass rods are arrayed in contact with each other in line, and a side plate 23 coated with an adhesive is bonded to the lens elements 21, thereby sandwiching the lens elements 21 by the upper and lower side plates 23. In arraying the lens elements 21, the adjacent lens elements need not be spaced apart from each other and no light-shielding layer need be formed between the adjacent lens arrays due to the presence of the light absorption layer 22 on the outer surface of each lens element 21. A high-precision array free from pitch and θ (tilt) errors can be obtained, and variations in lens characteristics in mass production can be prevented.

Each lens element 21 is finally cut in a desired height $Z_O$, and the surface of each lens is polished to obtain a mirror surface, thereby finishing a lens array 2.

The resolution of the image sensor using the lens array 2 manufactured by the above method can be improved because the light absorption layer for absorbing light in the wavelength range used in the light source of the image sensor is formed on the outer surface of each lens element 21 whose refractive index distribution is offset from that for the ideal resolution.

When external light entering the image sensor cannot be sufficiently shielded in the finished product such as a reading apparatus, an absorber for absorbing light in the wavelength range corresponding to the sensitivity range of the sensor IC is contained in the peripheral portion of the lens element. Then, the influence of the external light as noise can be minimized.

The light source of the image sensor generally emits visible light, whereas the general sensor IC has a high sensitivity to an infrared ray other than the visible light. It is effective to reduce the influence of external light when a dye for absorbing the infrared ray is contained in the peripheral portion of the lens element.

As the thickness of the light absorption layer 22 from the peripheral portion to the central portion of the lens element 21 increases, the angular aperture of the lens element is reduced to increase the focal depth. The following advantages are obtained in products using this feature.

For example, in a sheet-through scanner that feeds an original through it to an image sensor to read the original, a range array can form an original image on a sensor IC even if the original flaps to some extent. Therefore, the original sheet-through mechanism can be simplified to reduce the cost.

In a flat bed scanner in which an original is fixed in position, and an image sensor is moved to read the original image, the present invention can solve a conventional problem in which the bound portion of a book floats and cannot be focused.

As the thickness of the light absorption layer 22 of the lens element increases, the focal depth increases, but the transmittance of the lens array 2 decreases. Care must be taken for matching with the sensor sensitivity.

Figure 13:
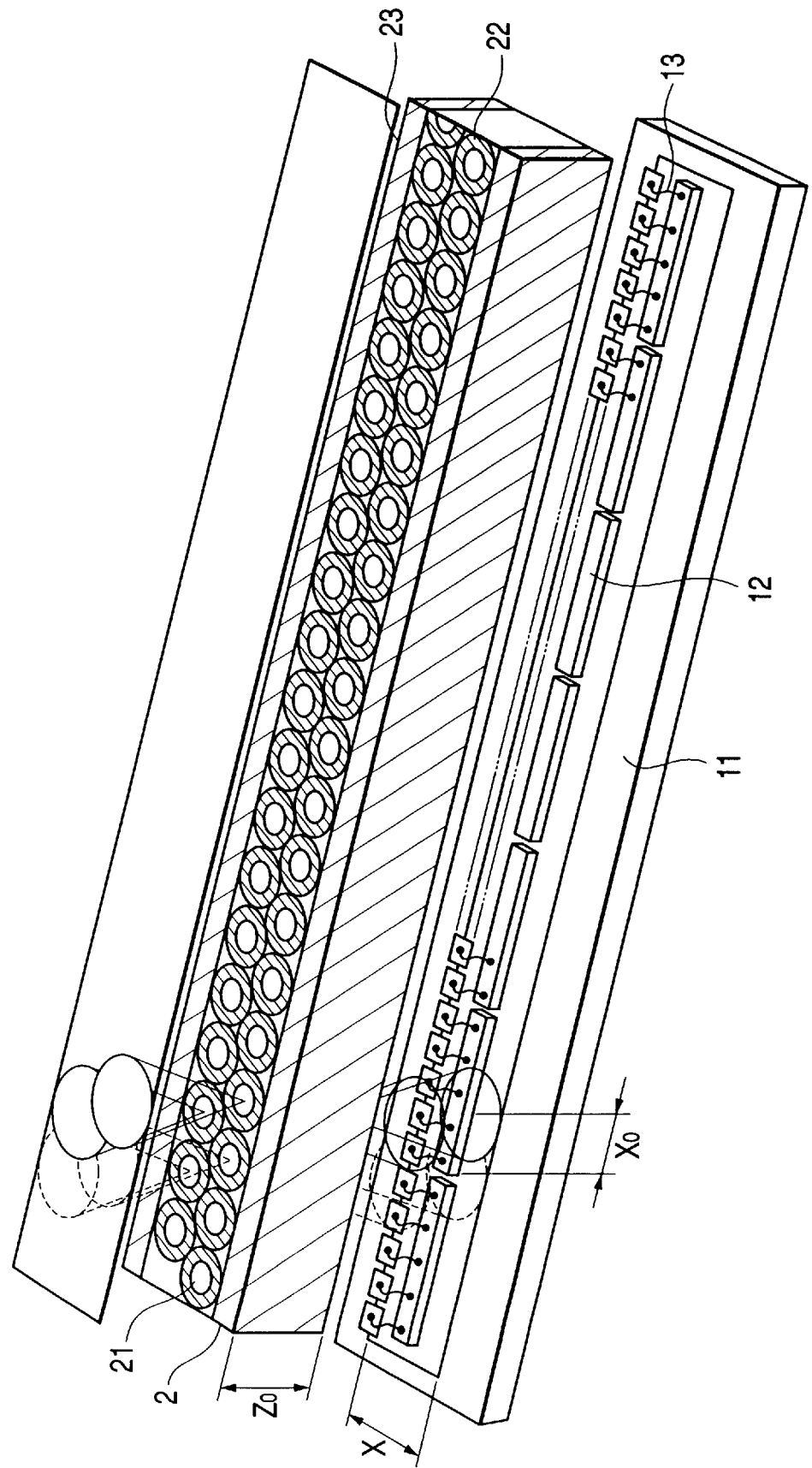
FIG. 13 is a detailed view of a lens array of another embodiment.

When a predetermined sensor output cannot be obtained due to a low sensor sensitivity, the use of two arrays of lens elements, as shown in FIG. 13, nearly doubles the lens transmittance.

A method of manufacturing an image sensor according to the present invention will be described below.

The illumination unit 3 and the lens array 2 are inserted into predetermined grooves formed in the frame 5 and are positioned in the widthwise and longitudinal directions.

The glass cover 4 is adhered on the inner surface of the frame 2 to sandwich the illumination unit 3 and the lens array 2 from the right and left so as to make the upper surface of the lens array approximately flush with the frame 4 and the illumination unit 3 while a warp correction pin 322 of the illumination unit 3 and the upper surface of the lens array 2 are pressed against the glass cover 4.

The illumination unit 3 and the lens array 2 are positioned and fixed with high precision without any warp. The illumination unit 3 can accurately send light to a desired illumination position, and an in-focus image can be formed throughout the lens array 2.

The sensor array 1 is fitted in the frame 5 and fixed with an adhesive or by partially caulking the frame. Leads 314 of the illumination unit 3 are electrically connected to the sensor board 11 by soldering or the like, thereby completing the image sensor.

An application example in which the image sensor of the present invention is applied to an information processing system will be described with reference to FIG. 14.

Figure 14:
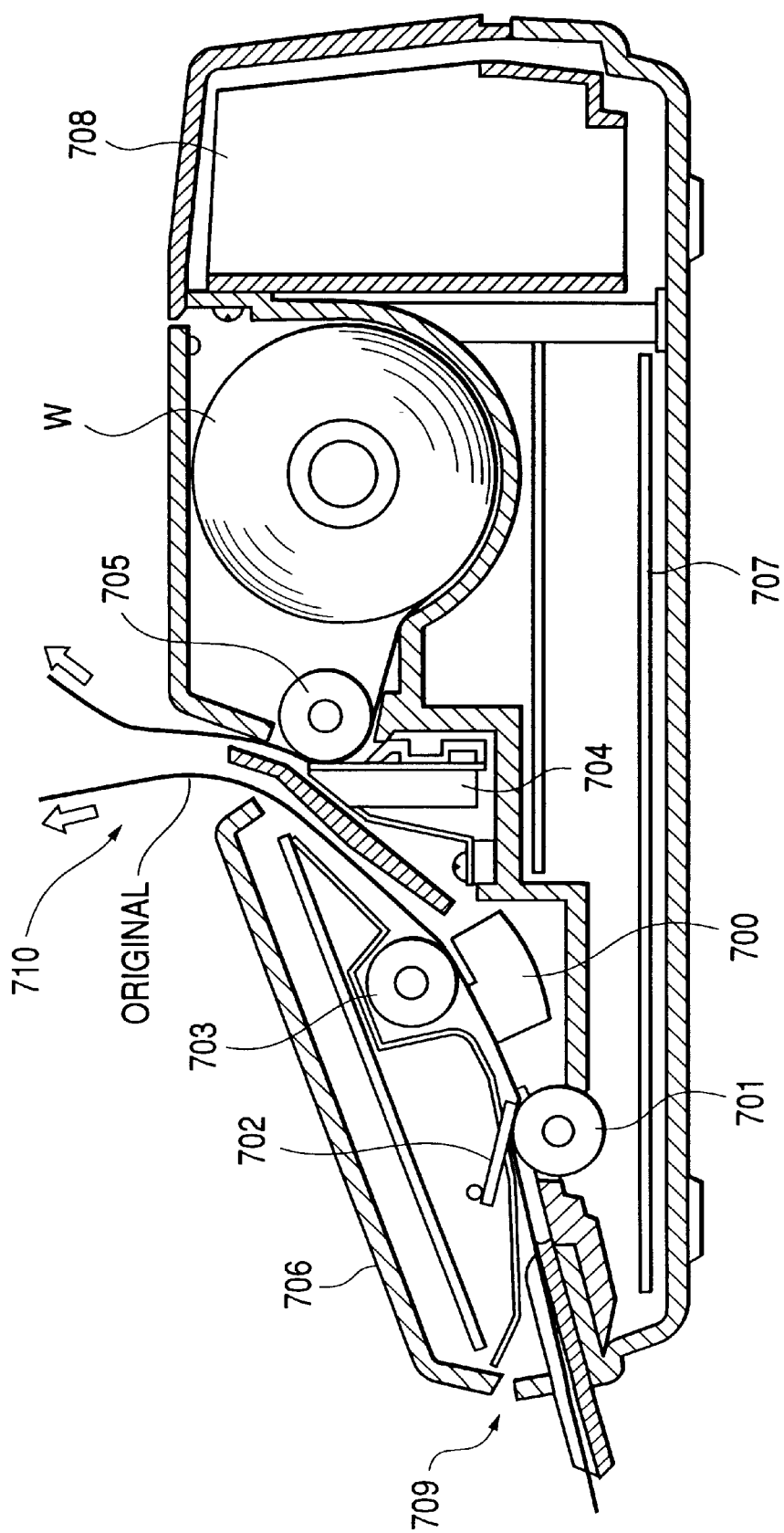
FIG. 14 is a sectional view of an information processing system of this embodiment.

FIG. 14 shows an information processing system (e.g., a facsimile system) which uses the image sensor of the present invention.

A paper feed roller 701 feeds an original to a read position. A separation piece 702 separates the originals one by one and reliably feeds each original. A convey roller 703 is located at the read position of an image sensor 700 to regulate the read surface of the original and convey the original. A recording medium W is a roll of paper. Image information read by the image sensor 700 or image data externally transmitted in the facsimile system is formed on the recording medium W. A print head 704 for forming an image comprises a thermal head, a bubble-jet print head, or the like. This print head may be of a serial or line type. A platen roller 705 conveys the recording medium to the print position and regulates the printing surface. A control panel 706 includes a display section for receiving operator's inputs. A system control board 707 includes a controller for controlling the respective components, a photoelectric conversion element drive circuit, an image information processing unit, and a transmitter/receiver. The information processing system also includes a power supply 708.

In this system, a microcomputer on the system control circuit board 707 controls the overall operations. The microcomputer also controls the image sensor 700, ON/OFF-controls the illumination unit 3, and controls to drive the sensor array 1.

A signal processing circuit on the system control circuit board 707 performs processing for recording an image signal read by the image sensor 700 on the recording medium W and image processing for externally outputting the image signal read by the image sensor 700.

In this embodiment, the image sensor 700 is incorporated in the information processing system. General external light (e.g., light from a fluorescent or incandescent lamp used in room illumination or sunlight entering from outside the room) enters a portion near the image sensor 700 as external light through a paper feed port 709 or a paper delivery port 710 which are located on the original convey path.

The external light contains a large number of infrared components in addition to visible light components. To prevent an image signal from being disturbed by the external light, it is effective to use a light absorber which sufficiently absorbs infrared rays in the gradient index element of the lens array used in the image sensor 700.

Figure 15:
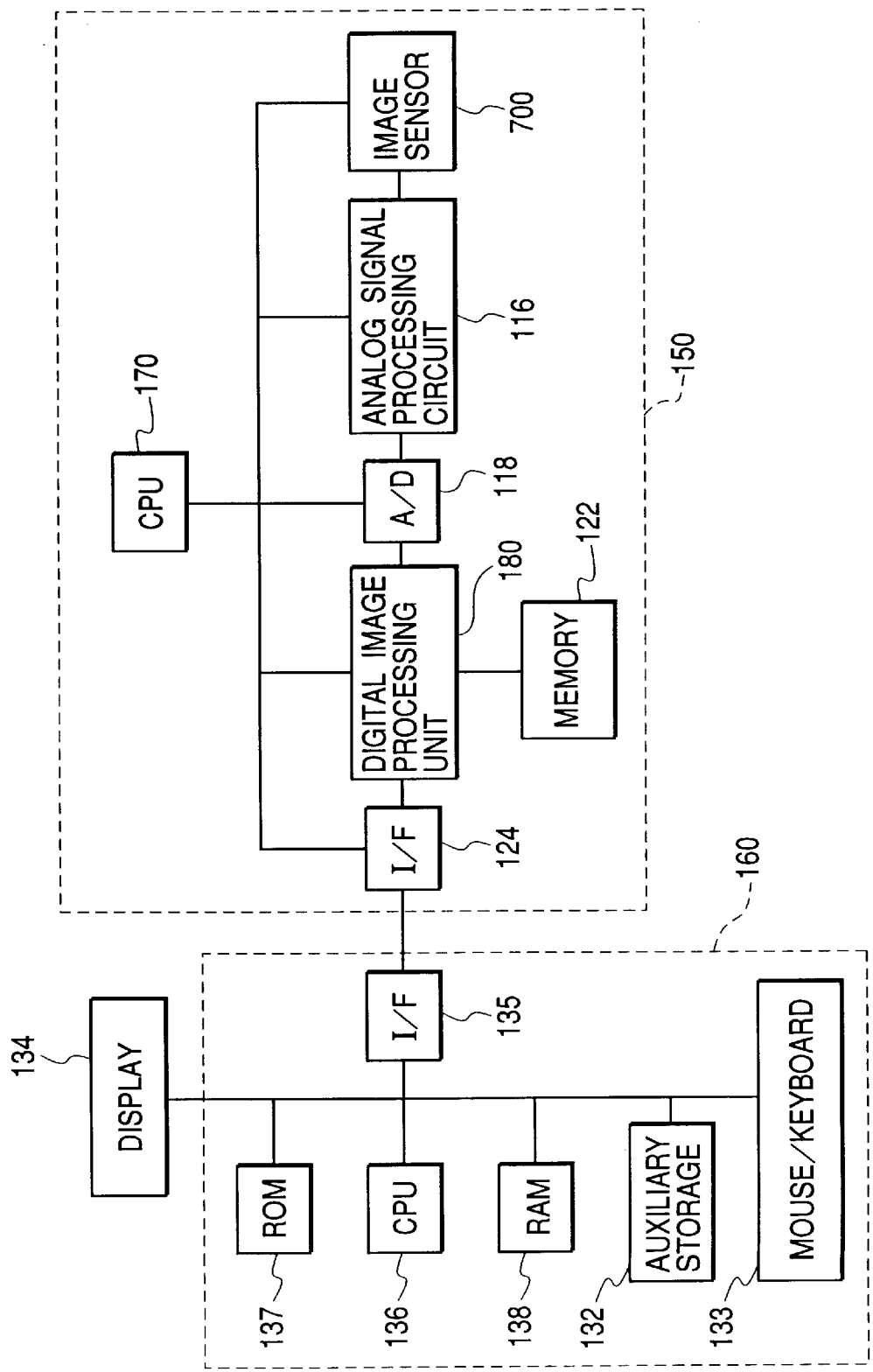
FIG. 15 is a functional block diagram between the information processing system and a computer of the embodiment.

FIG. 15 shows an information processing system which uses the image sensor 700 described in each embodiment. An image reading apparatus 150 incorporating the image sensor 700 is connected to a personal computer 160 to build an the information processing system. The read image information is output to the personal computer 160 or onto a network.

Referring to FIG. 15, a CPU 170 serves as the first control means for controlling the entire image reading apparatus 150. An image sensor 700 comprises the above-mentioned CCD light source and CCD line sensor and serves as a reading unit for converting an original image into an image signal. An analog signal processing circuit 116 performs analog processing such as gain adjustment of an analog image signal output from the image sensor 700.

An A/D converter 118 converts the output from the analog signal processing circuit 116 into a digital signal. A digital image processing circuit 180 performs image processing such as shading correction processing, gamma conversion processing, and magnification processing of output data from the A/D converter 118 using a memory 122. An interface (I/F) 124 externally outputs the digital image data processed by the digital image processing circuit 180.

The interface 124 complies with the standards such as SCSI or Bi-Centronics generally employed in personal computers.

The analog signal processing circuit 116, the A/D converter 118, the digital image processing circuit 180, and the memory 122 construct a signal processing means.

The personal computer 160 serving as the second control means is equipped with a magnetooptical disk drive, hard disk drive, and floppy disk drive.

A display 134 displays operations on the personal computer 160. A mouse/keyboard 133 is used to input commands to the personal computer 160.

An interface 135 exchanges data, commands, and status information of the image reading apparatus between the personal computer 160 and the image reading apparatus 150.

The personal computer 160 can input a read instruction to the image reading apparatus 150 with the mouse/keyboard 133.

When a read instruction is input from the mouse/keyboard 133, a CPU 136 transmits a read command to the image reading apparatus 150 via the interface 135. The personal computer 160 controls the image reading apparatus in accordance with a control program stored in a ROM 137. The control program may be stored in a storage medium such as a magnetooptical disk or floppy disk loaded into an auxiliary storage 132, loaded into a RAM 138 in the personal computer 160, and executed by the CPU 136.

The use of the image sensor 700 in the information processing system results in high applicability.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   an illumination unit for illuminating an object;
   a lens array having a plurality of cylindrical gradient index lenses for forming an image of light from the object, illuminated with said illumination unit, at an image formation position; and
   photoelectric conversion elements for receiving the light focused by the lens array,
   wherein each lens contains a light absorber for absorbing light having a wavelength detectable by said photoelectric conversion elements in part of a peripheral portion of the lens, the light absorber portion of the lens having a refractive index distribution and a predetermined thickness in a radial direction.

2. An apparatus according to claim 1, further comprising processing means for processing image information output from said photoelectric conversion elements.

3. An apparatus according to claim 1, further comprising convey means for conveying the object.

4. An apparatus according to claim 1, further comprising interface means for connection with an external device.

5. An apparatus according to claim 1, wherein the light absorber absorbs light having a predetermined wavelength other than a wavelength of light emitted by said illumination unit.

6. An apparatus according to claim 1, wherein the light absorber absorbs an infrared ray.

7. An apparatus according to claim 1, wherein the light absorber transmits light having a predetermined wavelength in ultraviolet light.

8. An apparatus according to claim 1, wherein the light absorber absorbs light having a wavelength emitted by said illumination unit.

9. An apparatus according to claim 1, wherein a light source of said illumination unit is an LED.

10. An apparatus according to claim 9, wherein the light source comprises a plurality of LEDs having different emission wavelengths.

11. An apparatus according to claim 10, wherein the light source comprises red, green, and blue LEDs.

12. An apparatus according to claim 1, wherein the light absorber absorbs light emitted by said illumination unit.

13. An image processing system comprising:
   (a) an image reading apparatus comprising:
      an illumination unit for illuminating an object;
      a lens array having a plurality of cylindrical gradient index lenses for forming an image of light from the object, illuminated with said illumination unit, at an image formation position; and
      photoelectric conversion elements for receiving light focused by the lens array,
      wherein each lens contains a light absorber for absorbing light having a wavelength detectable by said photoelectric conversion elements in part of a peripheral portion of the lens, the light absorber portion of the lens having a refractive index distribution and a predetermined thickness in a radial direction; and
   (b) processing means for processing image information output from said photoelectric conversion elements.

14. A system according to claim 13, further comprising convey means for conveying the object.

15. A system according to claim 13, further comprising forming means for forming an image from image information output from said image reading apparatus.

16. A system according to claim 13, further comprising control means for controlling the whole of said system.

17. A system according to claim 13, further comprising analog signal processing means for processing an analog signal output from said image reading apparatus;
   conversion means for converting the analog signal into a digital signal; and
   digital signal processing means for processing the digital signal.

18. A system according to claim 13, further comprising interface means for connecting to an external equipment.

19. A system according to claim 18, further comprising processing means for processing a signal input through said interface means.

20. A system according to claim 19, further comprising recording means for recording information to be processed by said processing means.

21. A system according to claim 13, wherein the light absorber absorbs light having a predetermined wavelength other than a wavelength of light emitted by said illumination unit.

22. A system according to claim 13, wherein the light absorber absorbs light emitted by said illumination unit.

23. A system according to claim 13, wherein the light absorber absorbs an infrared ray.

24. A system according to claim 13, wherein the light absorber transmits light having a predetermined wavelength in ultraviolet light.

25. A system according to claim 13, wherein the light absorber absorbs light having a wavelength emitted by said illumination unit.

26. A system according to claim 13, wherein a light source of said illumination unit is an LED.

27. A system according to claim 26, wherein the light source comprises a plurality of LEDs having different emission wavelengths.

28. A system according to claim 27, wherein the light source comprises red, green, and blue LEDs.

29. An image reading apparatus comprising:
   an illumination apparatus for illuminating an object;
   a lens array including a plurality of cylindrical gradient index lenses arranged in two lines adjacent to each other, for forming an image of light from the object illuminated by said illumination apparatus, at an image formation position, and lens array being sandwiched between two side plates; and
   a sensor array including a plurality of photoelectric conversion elements arranged in a line, for receiving the image of the light formed by said lens array,
   wherein each of said plurality of cylindrical gradient index lenses includes in a peripheral portion of the lens, a light absorber for absorbing light having wavelength detectable by said photoelectric conversion elements and the light absorber part of the lens has a refractive index distribution and predetermined thickness in a radial direction.

30. An apparatus according to claim 29, further comprising signal processing means for performing a predetermined signal processing on image information output from said sensory array.

31. An apparatus according to claim 29, further comprising interface means for connection to external equipment.

32. An apparatus according to claim 29, wherein said light absorber absorbs light having a predetermined wavelength other than a wavelength of light emitted by said illumination apparatus.

33. An apparatus according to claim 29, wherein said light absorber absorbs an infrared ray.

34. An apparatus according to claim 29, wherein said light absorber transmits light having a predetermined wavelength in ultraviolet light.

35. An apparatus according to claim 29, wherein said light absorber absorbs light having a wavelength emitted by said illumination apparatus.

36. An apparatus according to claim 29, wherein said illumination apparatus includes a plurality of light emitting elements arranged at an end portion in a longitudinal direction of said illumination apparatus and a light guide type light source for guiding incident light and irradiating the guided light in a predetermined direction.

37. An apparatus according to claim 36, wherein said plurality of light emitting elements are LEDs.

38. An apparatus according to claim 36, wherein said plurality of light emitting elements are LEDs having different emitting wavelengths.

39. An apparatus according to claim 38, wherein said LEDs are red, green and blue.

40. An apparatus according to claim 39, wherein the LEDs of the respective colors are turned on in sequence.

41. An apparatus according to claim 38, wherein said light guide type light source include a reflection surface arranged along the longitudinal direction, for irradiating light in the predetermined direction from the end portion.

42. An apparatus according to claim 41, wherein the reflection surface is formed by forming a saw-tooth shape on said light guide type light source.

43. An apparatus according to claim 41, wherein the reflection surface is formed by deposition of aluminum.

44. An apparatus according to claim 41, wherein the reflection surface is formed by coating of ink of silver color.

45. An apparatus according to claim 41, wherein the reflection surface is formed by a coating of ink white color.

46. An apparatus according to claim 41, wherein the reflection surface is a rough surface formed on said light guide type light source.

47. An image processing system comprising:
 (a) an image reading apparatus comprising:
  an illumination apparatus for illuminating an object;
  a lens array including a plurality of cylindrical gradient index lenses arranged in two lines adjacent to each other, for forming an image of light from the object, illuminated by said illumination apparatus, at an image formation position, and lens array being sandwiched between two side plates; and
  a sensor array including a plurality of photoelectric conversion elements arranged in a line, for receiving the image of the light formed by said lens array, wherein each of said plurality of cylindrical gradient index lenses includes in a peripheral portion of the lens, a light absorber for absorbing light having wavelength detectable by said photoelectric conversion elements and the light absorber part of the lens has a refractive index distribution and predetermined thickness in a radial direction;
 (b) signal processing means for performing predetermined signal processing on image information output from said image reading apparatus; and
 (c) moving means for changing a relative position between the object and said sensor array.

48. A system according to claim 47, further comprising image forming means for forming an image from the image information output from said image reading apparatus.

49. A system according to claim 47, further comprising control means for controlling each element of said system.

50. A system according to claim 47, wherein said signal processing means includes analog signal processing means for processing an analog signal output from said image reading apparatus, A/D conversion means for converting the analog signal into a digital signal and digital signal processing means for processing the digital signal.

51. A system according to claim 47, further comprising interface means for connecting to an external apparatus.

52. A system according to claim 47, further comprising recording means for recording the image information.

53. A system according to claim 47, wherein said light absorber absorbs light having a predetermined wavelength other than a wavelength of light emitted by said illumination apparatus.

54. A system according to claim 47, wherein said light absorber absorbs an infrared ray.

55. A system according to claim 47, wherein said light absorber transmits light having a predetermined wavelength in ultraviolet light.

56. A system according to claim 47, wherein said light absorber absorbs light having a wavelength emitted by said illumination apparatus.

57. A system according to claim 47, wherein said said illumination apparatus includes a plurality of light emitting elements arranged at an end portion in a longitudinal direction of said illumination apparatus and a light guide type light source for guiding incident light and irradiating the guided light in a predetermined direction.

58. A system according to claim 57, wherein said plurality of light emitting elements are LEDs.

59. A system according to claim 57, wherein said plurality of light emitting elements are LEDs having different emitting wavelengths.

60. A system according to claim 58, wherein said LEDs are red, green and blue.

61. A system according to claim 60, wherein the LEDs of the respective colors are turned on in sequence.

62. A system according to claim 57, wherein said light guide type light source includes a reflection surface arranged along the longitudinal direction, for irradiating light in the predetermined direction from the end portion.

63. A system according to claim 62, wherein the reflection surface is formed by forming a saw-tooth shape on said light guide type light source.

64. A system according to claim 62, wherein the reflection surface is formed by deposition of aluminum.

65. A system according to claim 62, wherein the reflection surface is formed by coating of ink of silver color.

66. A system according to claim 62, wherein the reflection surface is formed by a coating of ink white color.

67. A system according to claim 62, wherein the reflection surface is a rough surface formed on said light guide type light source.

68. An apparatus according to claim 29, further comprising moving means for changing a relative position between the object and said sensor array.

* * * * *

UNITED STATES PATENT AND TRADEMARK OFFICE
CERTIFICATE OF CORRECTION

PATENT NO.   : 6,115,187
DATED        : September 5, 2000
INVENTOR(S)  : Masami Tabata etc.

It is certified that error appears in the above-identified patent and that said Letters Patent is hereby corrected as shown below:

Column 2,
Line 12, "width 2 XO" should read -- width 2XO --; and
Line 13, "suffers" should read -- suffers from --.

Column 7,
Line 18, "frame 2" should read -- frame 5 --; and
Line 22, "4" should read -- 5 --.

Column 8,
Line 21, "an" should be deleted.

Column 10,
Line 59, "wavelength" should read -- a wavelength --; and
Line 67, "sensory" should read -- sensor --.

Column 11,
Line 29, "claim 38, " should read -- claim 36, --;
Line 30, "include" should read -- includes --.
Line 39, "coating" should read -- a coating --;
Line 41, "white" should read -- of white --;
Line 50, "object," should read -- object --; and
Line 61, "wavelength" should read -- a wavelength --.

UNITED STATES PATENT AND TRADEMARK OFFICE
CERTIFICATE OF CORRECTION

PATENT NO. : 6,115,187
DATED : September 5, 2000
INVENTOR(S) : Masami Tabata etc.

It is certified that error appears in the above-identified patent and that said Letters Patent is hereby corrected as shown below:

Column 12,
Line 57, "coating" should read -- a coating --; and
Line 59, "white" should read -- of white --.

Signed and Sealed this

Fourth Day of September, 2001

Attest:

*Nicholas P. Godici*

NICHOLAS P. GODICI
*Attesting Officer*   *Acting Director of the United States Patent and Trademark Office*